April 30, 1968  J. C. HUNTER  3,380,783
CONDUIT FOR PNEUMATICALLY CONVEYING PLASTIC
PARTICULATE MATERIAL
Filed Nov. 16, 1966
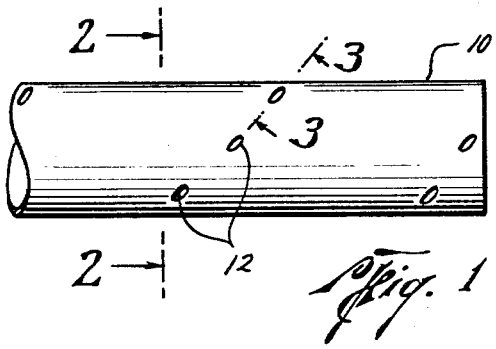
Fig. 1
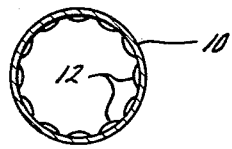
Fig. 2
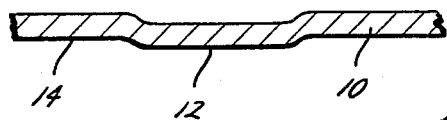
Fig. 3
Fig. 4
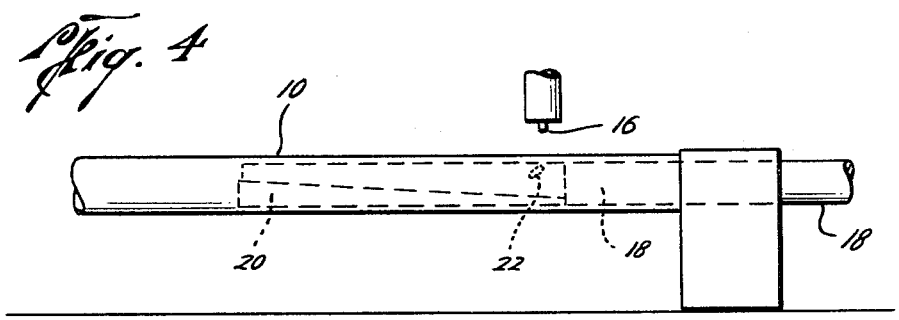
Fig. 5
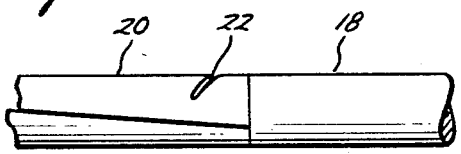
Jack C. Hunter
INVENTOR.
BY James F. Weiler
William A. Stout
Paul L. DeVerter II
Dudley R. Dobie, Jr.
ATTORNEYS

United States Patent Office 3,380,783
Patented Apr. 30, 1968

3,380,783
CONDUIT FOR PNEUMATICALLY CONVEYING
PLASTIC PARTICULATE MATERIAL
Jack C. Hunter, Kansas City, Mo., assignor to Black,
Sivalls & Bryson, Inc., Kansas City, Mo., a corporation
of Delaware
Filed Nov. 16, 1966, Ser. No. 594,735
2 Claims. (Cl. 302—64)

ABSTRACT OF THE DISCLOSURE

The present invention relates to an improved conduit for pneumatically conveying plastic particulate material, and more particularly to a conduit having spaced protuberances arranged in spiral relation projecting interiorly of the sidewall of the conduit and a method for forming said protuberances.

Conveyance of polyethylene and other particulate material by low pressure pneumatic systems suffers in many instances the tendency of the particulate material to form occasional skins or streamers on the sidewalls of the conduit of the conveyor system. The skin or streamer material accumulates until it is sloughed from the conduit sidewall resulting in fouling during molding, extruding and other such operations. Conventional means for preventing buildup of such skins or streamers have included randomly distributing rugae on the walls of the conduit as described in U.S. Patent No. 2,784,038 as well as the cutting of spiral grooves inside of the pipe or conduit as is well known in the art. All such conventional methods are directed to the same objective i.e., the maintaining of an abruptly descending velocity gradient between the main body of the air stream within the conduit and the walls of the conduit for interfering with continuous sliding surface contact of the particulate material with the conduit sidewals. However, each of the conventional approaches to the problem involves a lessening in thickness of the conduit wall thereby reducing useful life of the conduit. In addition, these conventional approaches to the problem involve expensive treatment of the pipe such as machining to cut grooves, insertion and securing of ribs to the interior of the pipe or sandblasting, etching, or anodizing to provide a sandy finish within the interior wall of the conduit. It would be highly advantageous to provide means in association with the interior walls of such conduit to inhibit the streamer formation whereby useful life of the conduit is not reduced and wherein the method for forming such means is inexpensive and expedient.

The present invention is directed to the provision of a plurality of spaced protuberances arranged in spiral relation interiorly to the sidewall of the conduit to interfere with continuous sliding surface contact of polyethylene or other particulate material having the property of skinning. The present invention is also directed to a method for forming such protuberances in a simple and inexpensive manner.

It is, therefore, an object of the present invention to attain the above advantages by the provision of spiral means projecting interiorly of the conduit sidewall for interfering with continuous sliding surface contact of plastic particulate material conveyed pneumatically therein.

A further object of the present invention is to provide a conduit for pneumatic conveyance of polyethylene or other particulate material having the property of skinning wherein a plurality of spaced protuberances are arranged to project interiorly of the conduit to interfere with continuous sliding surface contact of material conveyed therein with the conduit sidewall.

Still another object of the present invention is to provide spaced protuberances spirally arranged on the interior wall of the conduit for pneumatic conveyance of polyethylene or other particulate material whereby distance betwen spirals measured along the axis of the conduit is approximately three to four times the inside diameter of said conduit for interference with continuous sliding surface contact of the material with the conduit sidewall.

Yet another object of the present invention is to provide a method of imparting spiral protuberances interiorly of the sidewalls of a tubular conduit section by supporting the interior sidewalls of the conduit with support means having a partial yieldable surface, impressing the exterior surface of the conduit adjacent the partial yieldable surface of the support means to impart the protuberance, and advancing and rotating the tubular conduit section a predetermined amount so that further impressing of protuberances therein vary spirally of the conduit.

Other and further objects, features and advantages will be apparent from the following description of a presently preferred embodiment of the invention, given for the purpose of disclosure, and taken in conjunction with the accompanying drawings, where like character references designate like parts throughout the several views, and where:

FIGURE 1 is a partial side view of a section of pneumatic conveyor conduit according to the present invention, FIGURE 2 is a cross-sectional view taken along the line 2—2 of FIGURE 1, FIGURE 3 is a partial cross-sectional view of a protuberance within the conduit wall taken along the line 3—3 of FIGURE 1, FIGURE 4 is a partial illustration of an apparatus for forming protuberances within the conduit wall, and FIGURE 5 is a fragmentary view of a support means for use with the arrangement of FIGURE 4.

The present invention generally is directed to the provision of spiral protuberances within the interior wall of a conduit for use in low pressure pneumatic conveyance of polyethylene or other particulate material having the property of skinning or streamer formation within the conveyor stream. The protuberances are arranged in spiral relation with the conduit sidewall and, although the protuberances arranged in such manner provide only a fraction of the inner surface area of the conduit with means for interfering with the airstream, such arrangement effectively prevents skinning and streamer formation. Such quality of the protuberances is quite unexpected since heretofore it has been the experience of those skilled in the art that continuous contact of the particulate material with the inner conduit surface is to be avoided throughout the entire inner surface of the conduit if at all possible. Not only are spiral protuberances within the conduit sidewall effective to interfere with continuous sliding surface contact of particulate materials therewith, but the method of forming such protuberances is quite inexpensive and much more expedient than the prior art methods of adapting pneumatic conveyor conduits for similar purposes.

The type of low pressure pneumatic conveying system for use in which the present invention is intended is generally described in U.S. Patent No. 2,784,038. The system is well known in the art and no further description thereof is necessary.

With reference now to FIGURE 1, a tubular conduit or pipe 10 is provided with a plurality of protuberances 12 shown in FIGURE 1 as concave impressions on the outer surface of the conduit. The protuberances 12 are spaced and arranged in a spiral configuration along the axial length of the conduit 10 and project from the interior of the conduit sidewall as is better shown in FIGURE 2.

FIGURE 3 illustrates the typical protuberance 12 wherein the surface 14 is the interior surface of the sidewall of the conduit 10. The extent of projection of the protuberance 12 interiorly of the conduit 10 is not critical nor is the overall size of such protuberance. Spacing of protuberances along their spiral path likewise is not critical although a two inch spacing thereof is preferable and any greater spacing reduces effectiveness of interference with continuous sliding contact of material conveyed within the conduit. More limiting is the spacing of spirals of the protuberances wherein for best results the distance between spirals measured along the axis of the conduit should be approximately three to four times the inside diameter of the conduit.

By way of example only, superior results in a four inch inside diameter conduit for use under typical and well known conditions of low pressure pneumatic conveyance of polyethylene and other particulate material having the property of skinning have been obtained by use of protuberances ¾ inch in length, approximately ¹⁄₆₄ inch in interior projection and approximately 2 inches between centers of protuberances measured along the spiral path. The distance between spirals measured along the axis of the conduit was approximately 16 inches.

With reference now to FIGURES 4 and 5, the protuberances of the present invention are uniquely formed within the conduit wall as will now be described. The protuberances are formed by impressing the exterior surface of the tubular conduit section such as with a conventional die device 16. The conduit 10 to be impressed by the die 16 is mounted on a mandrel 18 having operatively associated therewith at one end a conventional wedge-actuated expansion mandrel 20. A short groove 22 is positioned on the expansion mandrel 20 thereby providing a partial yieldable surface in relation to the remainder of the surface of either mandrel 18 or 20.

In operation, the section of tubular conduit to which the protuberances of the present invention are to be imparted is placed over the mandrel 18 as shown in FIGURE 4. The mandrel 18 is suitably secured for conventional die stamping or impression operation as is well known in the art. The die 16 is positioned adjacent the groove 22 within the expansion mandrel 20 and the expansion mandrel 20 is then locked to support the interior wall of the conduit. The die 16 then impresses the exterior surface of the tubular conduit 10 whereby a concave impression or protuberance 12 as shown in FIGURES 1 and 2 is formed. The die 16 is then removed from the resulting impression, the expansion mandrel 20 is released, and the conduit section 10 is rotated and advanced a predetermined amount whereupon the impressing operation is repeated. By rotating and advancing the conduit 10 a predetermined amount after each impression is made by the die 16, a spiral pattern of protuberances thereby is formed.

It will be apparent to one skilled in the art that alternative methods of imparting spiral protuberances interiorly of the sidewalls of the tubular conduit section may be used. For example, the groove 22 of the expansion mandrel 20 may be formed spirally of the mandrel 20 in a continuous configuration. Then the mandrels 18 and 20 may be rotated which in turn imparts rotation to the conduit section 10. The die 16 may then be advanced along the length of the conduit simultaneous with rotation of said conduit at a predetermined rate so that repeated impressions or protuberances will be formed in a spiral configuration.

Thus provided is an improved means in association with the sidewalls of conduit for a low pressure pneumatic conveying system to interfere with continuous sliding contact of polyethylene or other particulate material being conveyed therein. As a result, skinning and streamer formation are effectively prevented by the spiral protuberances of the present invention.

While a presently preferred embodiment of the invention has been given for the purpose of disclosure, numerous changes in the details of construction, arrangement of parts, and steps of the process can be made which will readily suggest themselves to those skilled in the art and which are encompassed within the spirit of the invention and the scope of the appended claims.

What is claimed is:

1. In a conduit for conveying polyethylene or other material having the property of skinning, the combination with the sidewall of said conduit of the improvement comprising, a plurality of spaced protuberances arranged consecutively in spiral relation with the sidewall and constructed such that the distance between spirals measured along the axial length of the conduit is approximately three to four times the inside diameter of said conduit.

2. The invention of claim 1 wherein the spaced protuberances protrude at least approximately ¹⁄₆₄ inch interiorly of the conduit.

References Cited

UNITED STATES PATENTS

| | | | |
|---|---|---|---|
| 630,605 | 8/1899 | Gordon et al. | 138—39 |
| 855,651 | 6/1907 | Milne | 138—39 X |
| 1,840,857 | 1/1932 | Testrup et al. | 302—64 |
| 3,196,952 | 7/1965 | Solum | 138—39 X |
| 3,313,577 | 4/1967 | Wolfe | 302—64 |

FOREIGN PATENTS

| | | |
|---|---|---|
| 98,154 | 2/1940 | Sweden. |

EDWARD A. SROKA, *Primary Examiner.*

EVON C. BLUNK, *Examiner.*

M. L. AJEMAN, *Assistant Examiner.*